(12) United States Patent
Dai

(10) Patent No.: US 6,657,548 B2
(45) Date of Patent: Dec. 2, 2003

(54) SYSTEM STATUS LIGHT INDICATOR DEVICE EMBEDDED IN A CONNECTING PORT

(75) Inventor: Ming-Hou Dai, Taoyuan (TW)

(73) Assignee: Asustek Computer Inc., Taipei (TW)

( * ) Notice: Subject to any disclaimer, the term of this patent is extended or adjusted under 35 U.S.C. 154(b) by 252 days.

(21) Appl. No.: 09/852,005

(22) Filed: May 10, 2001

(65) Prior Publication Data

US 2002/0032885 A1 Mar. 14, 2002

(30) Foreign Application Priority Data

May 11, 2000 (TW) ...................................... 89207905 U

(51) Int. Cl.[7] .............................. G08B 5/22; G09F 9/33
(52) U.S. Cl. ................... 340/815.45; 439/490; 361/788
(58) Field of Search ........................ 340/815.45, 815.4, 340/815.42, 815.52, 693.5, 815.49; 439/488, 490, 917; 361/601, 686, 788

(56) References Cited

U.S. PATENT DOCUMENTS 5,685,741 A * 11/1997 Dewey et al. .............. 439/668
6,501,897 B1 * 12/2002 German et al. ............. 385/134
6,503,105 B1 * 1/2003 Johnsen ...................... 439/668

* cited by examiner

Primary Examiner—Toan N Pham
(74) Attorney, Agent, or Firm—Rabin & Berdo, P.C.

(57) ABSTRACT

A system status light indicator device embedded in a connecting port is made up of an error message processor and a plurality of light emitting diodes (LED), suitable for use with a Basic Input-Output System (BIOS) program. When the BIOS examines a plurality of the peripheral devices on the computer, as soon as an error is found, the warning signals can be sent to the error message processor, and then the corresponding error message data is retrieved. Next, it outputs the error message data to the system status indicator devices embedded in a connecting port. Thus, the operators can know exactly where the problems are located via the indicated boot-up warning signals sent out that indicate system status, and the messages corresponding to the light indicators recorded in the user's manual. The above-described error message data uses the light indicators to display the various causes of breakdown.

13 Claims, 3 Drawing Sheets

SYSTEM STATUS LIGHT INDICATOR DEVICE EMBEDDED IN A CONNECTING PORT

CROSS-REFERENCE TO RELATED APPLICATION

This application claims the priority benefit of Taiwan application serial no. 89207905, filed on May 11, 2000.

BACKGROUND OF THE INVENTION

1. Field of the Invention

The present invention relates to a system status light indicator device embedded in a connecting port. More particularly, the present invention relates to a system status light indicator device embedded in a connecting port which can clearly indicate to users the causes of breakdowns via the warning light indicators during the booting-up process.

2. Description of Related Art

When we turn on the power of a personal computer, the central processing unit (CPU) inside the PC may start executing a series of commands; the commands can be approximately divided into three categories according to the functions:

1. System Configuration Analysis (SCA) analyzes the CPU type, the size of memory, the number and types of floppy and hard disks, yes or no to install the floating processor as an important reference for the other actions.
2. The Power On Self Test (POST) program tests the status of hardware such as the memory, chipsets, CMOS, stored data, keyboard and disk drives; once an error is found, it will report the problems.
3. The address allocation of the operating system (like the MS-DOS, Windows 95/98) and loads it up via what is called the "Bootstrap Loader" short program, passes the control of the computer to the operating system and officially ends the boot-up action.

The program organized by the above commands is called the Basic Input Output System (BIOS) program, therefore, the BIOS can be said as first program executed after the personal computer is turned on. If it cannot run the BIOS program normally while in the process of booting-up the computer, generally, the hardware can withstand certain problems; the problems should first be removed before continuing further operations, thereby ensuring that the computer is running in the optimal mode.

However, in order not to infringe to the copyrights of the BIOS originally made by IBM, the BIOS programs designed by different vendors may process them with the same function but different program codes, using the error message data in the above-described POST program procedure as an example, the boot-up warnings of the BIOS programs of three different vendors (IBM, AWARD, AMI), are defined differently and listed in the tables below:

TABLE I

Boot-up Warnings for the BIOS of IBM

| Beep | Meaning |
| --- | --- |
| None | Power supply and CPU breakdown |
| Continuous | Memory breakdown |
| Short | System self-test, normal condition |

TABLE I-continued

Boot-up Warnings for the BIOS of IBM

| Beep | Meaning |
| --- | --- |
| Two short | Error found during self-test and it is displayed on the monitor |
| Continuous short | Power supply and motherboard breakdown |
| One long and one short | Errors on the motherboard |
| One long and two short | Errors on the display |
| One long and three short | Errors on the EGA card |
| Three long | Errors on the keyboard controller |

TABLE II

Boot-up Warnings for the BIOS of AWARD

| Beep | Meaning |
| --- | --- |
| One short | Not an error, indicates system turn-on |
| One long and two short | Errors on the EGA card |
| Two short | There are errors and is indicated on the monitor |
| One long and three short | Errors on the keyboard controller |

TABLE III

Boot-up Warnings for the BIOS of AMI

| Beep | Meaning |
| --- | --- |
| 1 | Defects on the memory regain chipset |
| 2 | Errors found while checking the first 64K of memory |
| 3 | Defects on the first 64K of memory and are unreadable |
| 4 | Clock on the motherboard is out of order |
| 5 | CPU breakdown |
| 6 | keyboard controller breakdown, disabled to enter the protected mode |
| 7 | Errors on the abnormal interrupt of CPU |
| 8 | Errors on the read- write memory display region |
| 9 | Errors on the checking value of ROM |
| 10 | Errors on the read-write of CMOS shutoff register |
| 11 | Errors on the cache |

From the tables above, we find that the boot-up warnings set by different PC vendors make use of long and short beep combinations to indicate problems that arise during the booting-up process to users. However, since the specifications set by each vendor are not the same, and most users would not remember the meanings of the different warning signals; there is no point in having quick self-maintenance for understanding the meanings of different boot warnings in the internal process of computers.

SUMMARY OF THE INVENTION

Accordingly, the present invention is to provide a system status light indicator embedded in a connecting port suitable for use for a BIOS program; when the BIOS program detects that errors have occurred on the peripheral devices of the computer, it will send out a set of the warning signals.

The system status light indicator embedded in a connecting port comprises of an error message processor and a plurality of light emitting diodes (LED). Firstly, the BIOS program starts checking the peripheral devices of the computer, and as soon as the BIOS program detects errors, it will send out a set of warning signals to the error message processor, and retrieves the error message data previously stored in the error message processor that correspond to the warning signals. Thus, based on the light indications of the system boot-up warning status, the user can consult the user's manual in which the light indications corresponding to the error signals are stated, and can know precisely where the problem lies. The above-described error message indicates the causes of the breakdowns via the error message signal.

Since the causes of breakdowns have been recorded in the error message processor, when the BIOS program detects the peripheral device errors, the cause of breakdown can be found by consulting the light indications corresponding to the error signals recorded in the user's manual. Thus, the user knows exactly what the problem lies, and without having to guess what a beep signifies, or having to inspect each device one by one. The direct use of a newly designed universal serial bus (USB) connecting port and a printer connecting port provides many embedded LED lights that display the system status and which do not require definitions of special input/output shields.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention, and, together with the description, serve to explain the principles of the invention. In the drawings.

DESCRIPTION OF THE PREFERRED EMBODIMENTS

Figure 1:
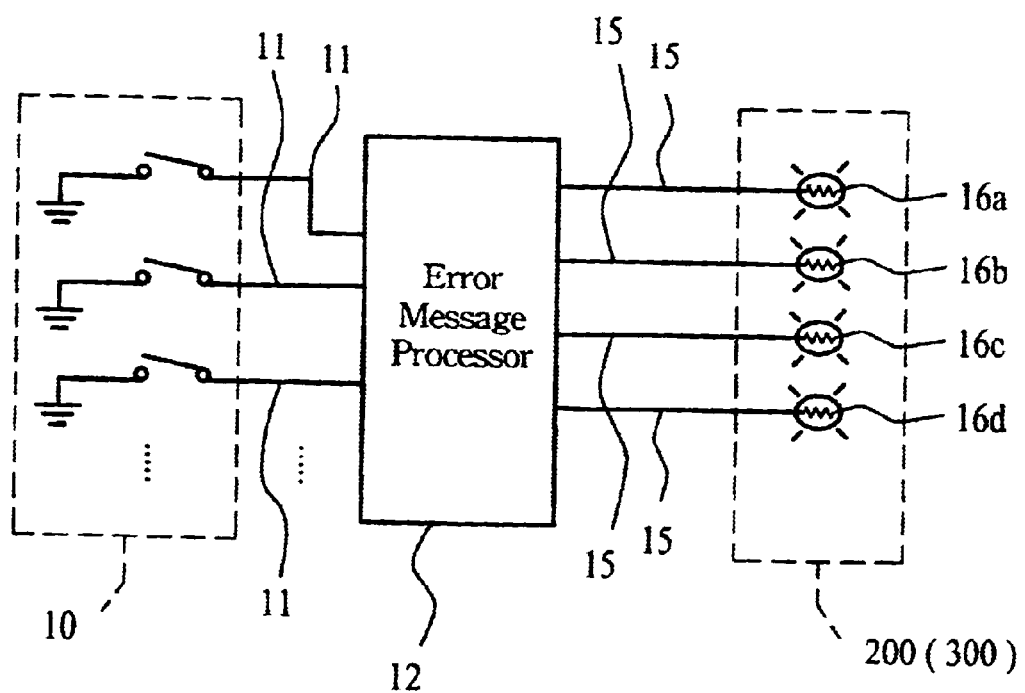
FIG. 1 is a structural illustration of a system status light indicator embedded in a connecting port, according to the present invention.

FIG. 1 is a structural view of a system status light indicator embedded in a connecting port. In FIG. 1, it can be seen that the present invention features a system structure indicating the causes of breakdown, which includes the error message processor 12 and the system status light indicators 16a~16d. The system status light indicators 16a~16d are embedded into the newly-designed USB port 200 and printer port 300. The existing status displaying system is not modified, and an I/O shield does not require special definition.

Now, let us continue describing the running procedures of the system status light indicator embedded in a connecting port from the present invention. Firstly, when the computer is turned on, the computer will proceed with the BIOS program itself. The BIOS program will use the POST program to check the hardware status of the peripheral devices such as the memory, chipset, CMOS, stored data, keyboard and hard drive. Once there are such errors as no display on the monitor, shortage of electricity in the CMOS battery, hard disk install failure, and keyboard error or no keyboard present, the BIOS drive program will send out the warning signal 11 via the controllable output port such as a portion for input and startup 10 (as shown in FIG. 1) and retrieve the error message data 15, which corresponds to the warning signal and is stored inside the error message processor 12, followed by outputting the error message data 15 to the system status light indicators 16a~16d embedded in the port connectors 200 or 300. The user refers to the error message corresponding to the light indicators recorded in the user's manual to guide the user to locate precisely where the problem is.

The above-described error message data uses the light indicators 16a~16d to indicate the causes of breakdown, and enables the user to easily understand what the computer problem is, so that maintenance and further handling can be facilitated.

Figure 2A:
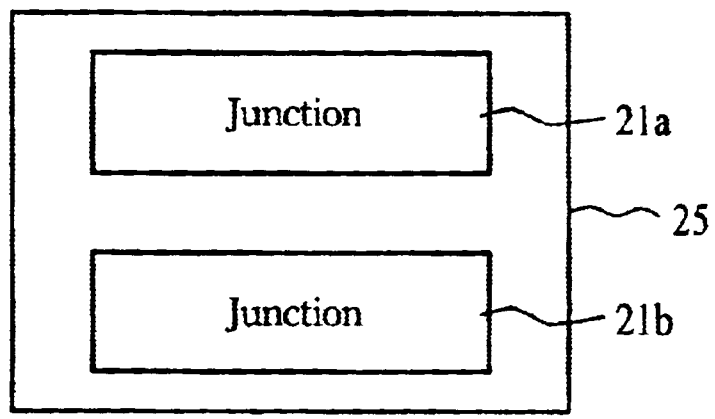
FIG. 2A illustrates a conventional universal serial bus.

FIG. 2A illustrates a conventional USB connecting port 20, in consideration of Electro-magnetic interference (EMI), the computer motherboards used nowadays are all featuring the I/O shield 25 in the input and output connecting ports. The consideration of the present invention of a system status light indicator device embedded in a connecting port lies in not modifying the existing I/O shield 25, and in not influencing the efficiency of the original connecting port, while providing many LED signals that indicate system status. The USB connecting port 20 includes one USB connecting port I/O shield 25 and the two junctions 21a and 21b of the USB connecting port.

Figure 2B:
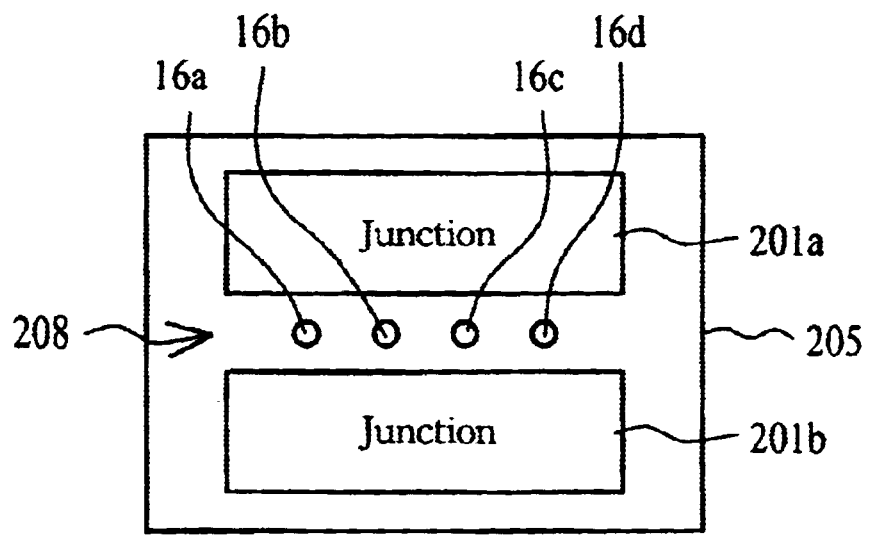
FIG. 2B shows a serial bus connecting port featuring the system status light indicator embedded in a connecting port.

FIG. 2B illustrates the USB connecting port 200 in a preferred embodiment featuring the system status light indicator device embedded in a connecting port according to the present invention. Since most of the I/O shield 205 within the USB connecting port 200 is not located in the space 208 between the two junctions 201a and 201b of the USB connecting port. The system status can be indicated through the use of many LED light indicators 16a~16d embedded in the space 208.

Figure 3A:
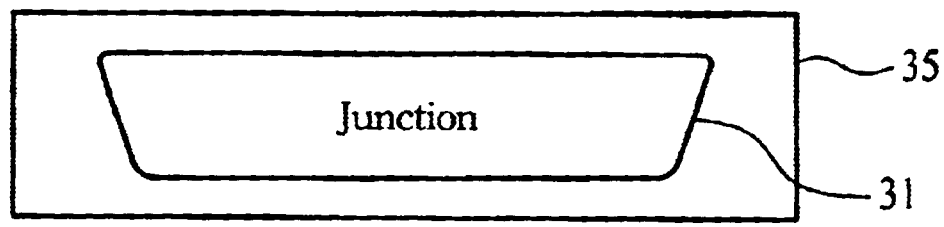
FIG. 3A illustrates a conventional printer connecting port.

FIG. 3A illustrates a conventional printer connecting port, wherein the printer connecting port 30 includes a printer connecting port I/O shield 35 and a junction 31 of the printer connecting port.

Figure 3B:
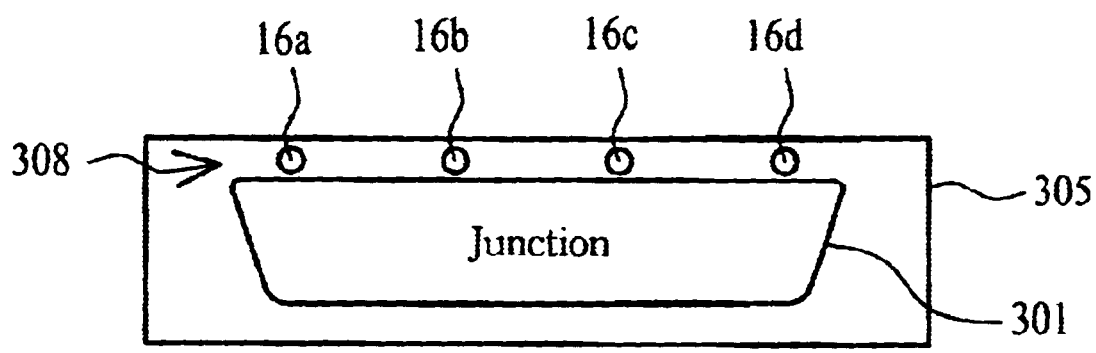
FIG. 3B illustrates the printer connecting port featuring the system status light indicator embedded in a connecting port.

FIG. 3B illustrates a printer connecting port 300 in a preferred embodiment featuring system status light indicators embedded in a connecting port according to the present invention. Since there is only a narrow space 308 between the junction 301 of printer connecting port 300 and the I/O shield 305, therefore, the preferred embodiment featuring the system status light indicator device embedded in a connecting port stays as near as possible to the I/O shield 305 of the printer connecting port 300 in the present invention. Consequently, the system status can be clearly indicated by identifying a plurality of the LED indicators 16a~16d, and meanwhile the electromagnetic radiation protection is not affected.

In summary of the above, it can be seen that the system status light indicator device embedded in a connecting port in the present invention, the conventional beep settings by various vendors can be modified into light signals. Thus users can quickly locate the problems without having to guess at the meaning of the beeps, or to perform checks on the peripheral devices one by one.

The present invention has been disclosed using an exemplary preferred embodiment. However, it is to be understood that the scope and the sprit of the invention is not limited to the disclosed embodiments, on the contrary, it is intended to cover various modifications and similar arrangements, the scope of the claims, therefore, should be accorded the broadest interpretation so as to encompass all such modifications and similar arrangements.

What is claimed is:

1. A system status light indicator device embedded in a connecting port, suitable for use on a computer of a computer system which includes a plurality of peripheral devices, the computer having a BIOS program that is used for checking the peripheral devices and sending out a warning signal if an error is found in one of the peripheral devices, the system status light indicator device comprising:

an error message processor that receives the warning signal sent out from the BIOS program, the error message processor retrieving and outputting an error message data which corresponds to the warning signal and has previously been stored in the error message processor; and a plurality of light indicators, embedded in the connecting port and electrically connected to the error message processor, to visually signal the error message data received from the error message processor.

2. The system status light indicator device embedded in a connecting port as claimed in the claim 1, wherein the light indicators are a plurality of light emitting diodes (LED).

3. The system status light indicator device embedded in a connecting port as claimed in the claim 1, wherein the connecting port is a universal serial bus (USB) port.

4. The system status light indicator device embedded in a connecting port as claimed in claim 3, wherein the USB port includes two USB connecting port junctions, and between the two junctions.

5. The system status light indicator device embedded in a connecting port as claimed in the claim 1, wherein the connecting port is a printer connecting port.

6. The system status light indicator device embedded in a connecting port as claimed in the claim 5, wherein the printer connecting port includes a printer connecting port junction, an I/O shield, and a space between the printer connecting port junction and the I/O shield, the light indicators being disposed in the space.

7. A connecting port device with embedded light indicators, suitable for use on a computer system which includes at least one peripheral device, the computer having a BIOS program that is used for checking the at least one peripheral device and producing a warning signal if an error is found in the at least one peripheral device, the connecting port device comprising:

a connecting port, which includes at least one connecting port junction and an I/O shield encompassing the outer area of the at least one connecting port junction; and a plurality of light indicators embedded into a space adjacent the at least one connecting port junction.

8. The connecting port device with embedded light indicators as claimed in the claim 7, wherein the light indicators are light emitting diodes.

9. The connecting port device with embedded light indicators as claimed in the claim 7, wherein the connecting port is a USB connecting port.

10. The connecting port device with embedded light indicators as claimed in the claim 9, wherein the USB connecting port includes two USB connecting port junctions, and wherein the light indicators are embedded in a space between the USB port connectors.

11. The connecting port device with embedded light indicators as claimed in the claim 7, wherein the connecting port is a printer connecting port.

12. The connecting port device with embedded light indicators as claimed in the claim 11, wherein the printer port includes at least one printer connecting port junction, and wherein the light indicators are embedded in a space between the at least one printer connecting port and the I/O shield.

13. The connecting port device with embedded light indicators according to claim 7, wherein the computer further comprises an error message processor for outputting an error message data corresponding to the warning signal.

* * * * *